(12) United States Patent
Hirai et al.

(10) Patent No.: US 7,725,742 B2
(45) Date of Patent: May 25, 2010

(54) REMOTE MONITOR MODULE FOR POWER INITIALIZATION OF COMPUTER SYSTEM

(75) Inventors: Tomonori Hirai, Fremont, CA (US); Jyh Ming Jong, Fremont, CA (US)

(73) Assignee: Mitac International Corp., Taoyuan (TW)

( * ) Notice: Subject to any disclaimer, the term of this patent is extended or adjusted under 35 U.S.C. 154(b) by 764 days.

(21) Appl. No.: 11/567,472

(22) Filed: Dec. 6, 2006

(65) Prior Publication Data
US 2008/0046707 A1 Feb. 21, 2008

Related U.S. Application Data

(60) Provisional application No. 60/822,430, filed on Aug. 15, 2006.

(51) Int. Cl.
*G06F 1/00* (2006.01)
*G06F 15/177* (2006.01)
*G06F 11/00* (2006.01)

(52) U.S. Cl. ................. 713/300; 713/1; 713/2; 714/14; 714/43; 710/72

(58) Field of Classification Search ............ 713/1, 713/2, 3, 300; 710/72; 714/14, 43
See application file for complete search history.

(56) References Cited

U.S. PATENT DOCUMENTS

| 6,333,650 | B1 * | 12/2001 | Amin et al. | 327/143 |
| 7,496,694 | B2 * | 2/2009 | Balasubramanian et al. | 710/15 |
| 2004/0073712 | A1 * | 4/2004 | Larson et al. | 709/249 |
| 2004/0098521 | A1 * | 5/2004 | Lin | 710/72 |
| 2005/0235083 | A1 * | 10/2005 | Tsushima et al. | 710/104 |
| 2006/0255832 | A1 * | 11/2006 | Speers et al. | 326/39 |
| 2007/0079162 | A1 * | 4/2007 | Mundada et al. | 713/330 |
| 2007/0226539 | A1 * | 9/2007 | May | 714/14 |
| 2007/0240019 | A1 * | 10/2007 | Brady et al. | 714/43 |

* cited by examiner

*Primary Examiner*—Vincent T Tran
(74) *Attorney, Agent, or Firm*—Quintero Law Office (57) ABSTRACT

A remote monitor module for power initialization of a computer system includes a monitor logic and a BMC (Baseboard Management Controller). The monitor logic is in circuit connection with a power-up sequence controller and several basic voltage domains on a system board of the computer system. The monitor logic also defines a monitor power-up sequence to perform a basic power-up sequence defined in the power-up sequence controller and allow system changes in power initialization. Extra voltage domain(s) may be enabled and monitored according to the monitor power-up sequence. Eventually, multiple power initialization event/state signals are transmitted by the monitor logic to a remote management host through the BMC.

18 Claims, 8 Drawing Sheets

REMOTE MONITOR MODULE FOR POWER INITIALIZATION OF COMPUTER SYSTEM

BACKGROUND OF THE INVENTION

1. Field of Invention

The present invention relates to remote monitoring, and more particularly to a monitor module for remotely monitoring the power initialization of a computer system.

2. Related Art

Generally, there are two major portions involved in the system initialization process of a computer system. One is before first fetching the initialization codes (BIOS) and the other is after starting to fetch the BIOS. The primary process in the former section is to turn on all basic voltage rails with proper basic power-up sequence, and release reset signals. A typical system chipset(s) usually controls the basic power-up sequence on a system board of the computer system. However, only several common power-related initialization statuses such as "power good indication", "system reset signal status" and etc. are monitored during the system initialization process. For a highly reliable computer system, only monitoring these basic power status signals is lack of implementation flexibility and far behind the control requirements.

Figure 1:
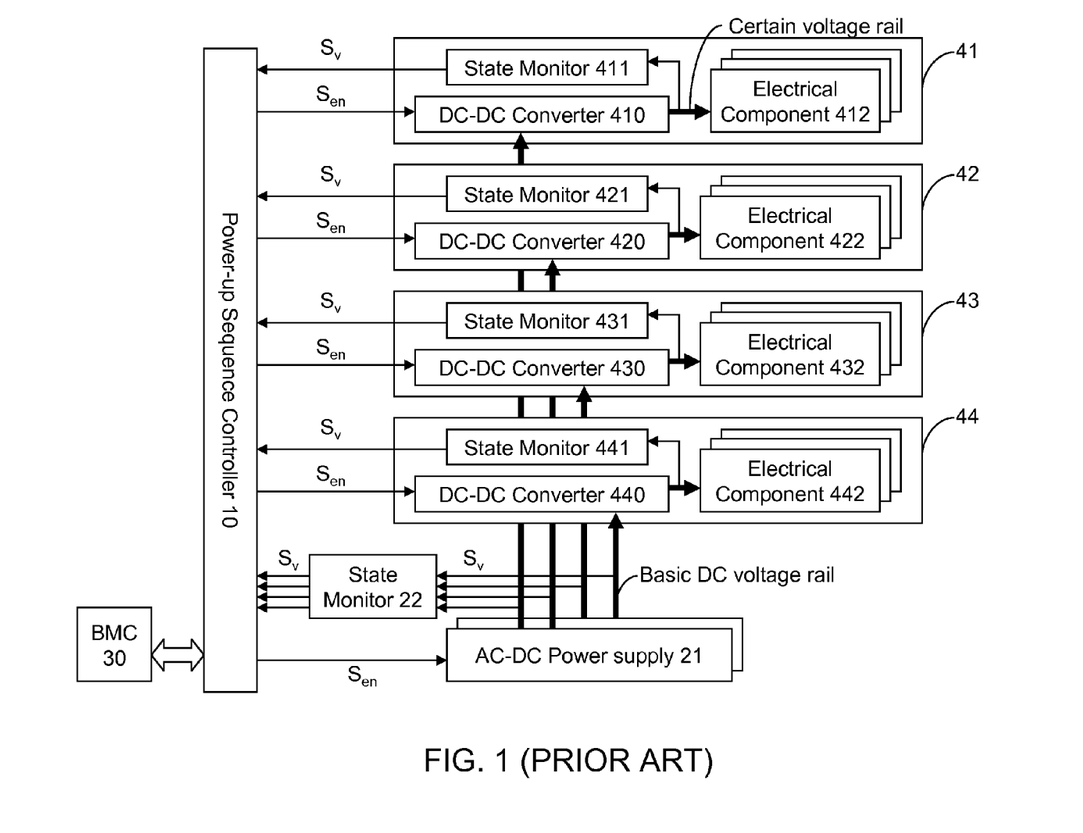
FIG. 1 is an explanatory diagram of the control architecture for power initialization in the prior art.

Please refer to FIG. 1, which illustrates a typical legacy architecture for monitoring power initialization on a system board. A power-up sequence controller 10, possibly embedded in system chipset(s) or South Bridge, is mainly for controlling the basic power-up sequence of one or more AC (Alternating Current)-DC (Direct Current) power supply 21, DC-DC converters 410, 420, 430, 440 and various basic voltage domains 41, 42, 43, 44. The AC-DC power supply 21 converts AC electricity to several basic DC voltage rails for the basic voltage domains 41, 42, 43, 44. The DC-DC converters 410, 420, 430, 440 converts the basic DC voltage rails to the designed voltage rails and provide to the electrical components 412, 422, 432, 442 involved in the dedicated basic voltage domains 41, 42, 43, 44.

When the system board is turned on with power, the power-up sequence controller 10 needs to transmit basic enable signals $S_{en}$ to enable the AC-DC power supply 21 and the DC-DC converters 410, 420, 430, 440 according to a basic power-up sequence (FIG. 2) predetermined in a dedicated basic state machine (or sequence machine, not shown) of the power-up sequence controller 10. Specific status monitors 22, 411, 421, 431, 441 detect the output electricity for each of the AC-DC power supply 21 and the DC-DC converters 410, 420, 430, 440, and then send basic valid (or "power good") signals $S_v$ back to the power-up sequence controller 10 if the output electricity is normal.

However, the power-up sequence controller 10 does not monitor every power initialization statuses/events or every voltage rails during the whole system initialization process on the system board. When the power initialization fails, it is possible that the power-up sequence controller 10 cannot verify exactly which voltage rail is malfunctioned. Similarly, some power initialization statuses/events can not be monitored unless a scope or logic analyzer is used.

Besides, some significant components such as CPU(s) require a specific power-up sequence for enabling various voltage rails. But the built-in state machine of the power-up sequence controller 10 generally does not allow any changes involved in the basic power-up sequence. Furthermore, mostly the available power initialization status signals are typically sent to a LED-type indicator (not shown) for board-level management; which is, namely, difficult for remote system management. Using either the logic analyzer or read the LED indicator needs to open the chassis, which is undoubtedly time/effort consuming. Even though in specific implementation these basic power signals may be sent to a local BMC (Base Management Controller) type circuit (BMC 30 in FIG. 1) for remote control, the monitored status/event signals are still limited and lack of flexibility for system changes.

SUMMARY OF THE INVENTION

The problems noted above are solved in large part by adding extra hardware circuit(s) to capture more initialization statuses/events according to the present invention. Also, extra communication path(s) between the extra hardware circuits and the BMC may be provided by the present invention to access the initialization statuses/events without opening chassis or connecting with a logic analyzer.

According to an exemplary embodiment of the invention, the remote monitor module includes a BMC (Baseboard Management Controller) and a monitor logic. The BMC is for connecting with a remote management host. The monitor logic is in circuit connection with the BMC, and a power-up sequence controller and a plurality of basic voltage domains of the system board. It transmits plural basic enable signals received from the power-up sequence controller to enable the basic voltage domains, and transmits plural basic valid signals received from the basic voltage domains to the power-up sequence controller, and eventually generates and transmits plural power initialization event/state signals to the remote management host through the BMC.

In accordance with another exemplary embodiment of the invention, a basic power-up sequence is defined in the power-up sequence controller and a monitor power-up sequence is defined in the monitor logic. The basic power-up sequence is included in the monitor power-up sequence. The monitor logic transmits the basic enable and valid signals and the power initialization event/state signals according to the monitor power-up sequence.

In accordance with another exemplary embodiment of the invention, the monitor logic is in circuit connection with extra voltage domain(s). The monitor logic may transmits extra enable signal(s) according to the monitor power-up sequence to enable the extra voltage domain, and receives extra valid signal(s) from the extra voltage domain.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 3:
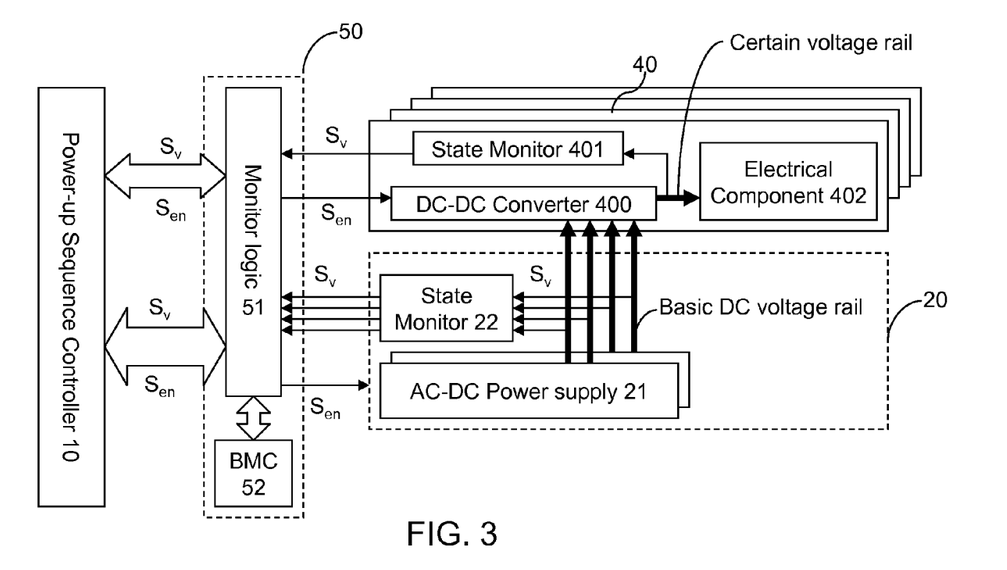
FIG. 3 is an explanatory diagram of a preferred embodiment, illustrating a monitoring architecture for power initialization according to the present invention.

Referring to FIG. 3, in an embodiment of the present invention, a remote monitor module 50 is configured in circuit connection with a power source domain 20 of a computer system (not shown), and with a power-up sequence controller 10 and several basic voltage domains 40 on a system board (not shown) of the computer system. The computer system in the present invention may include more than one system board.

Figure 2:
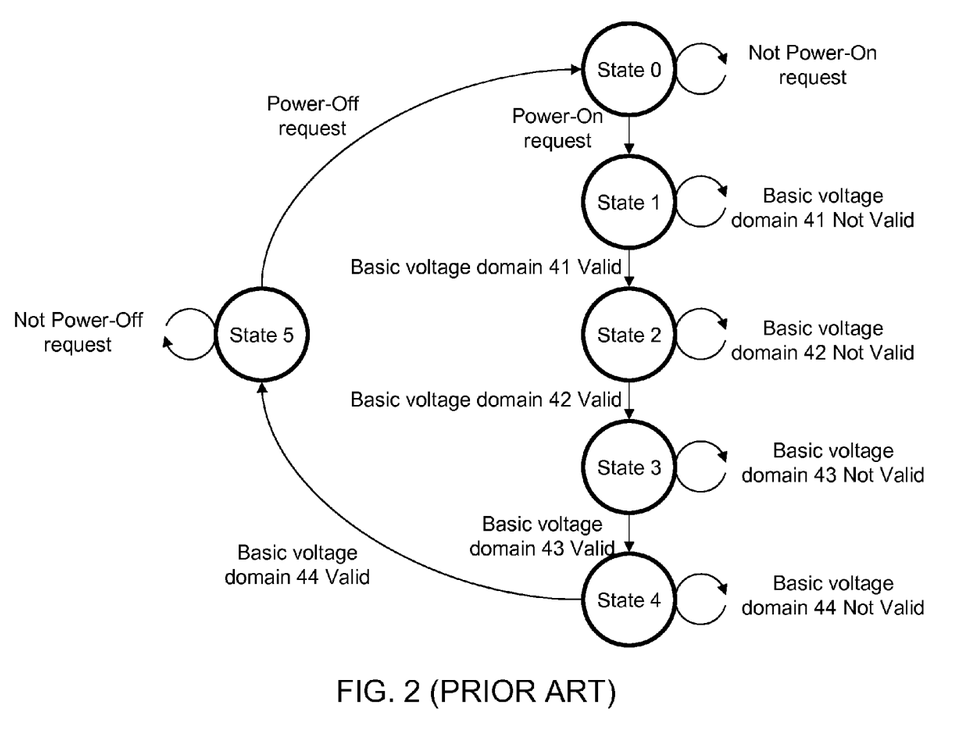
FIG. 2 is an explanatory diagram of a basic power-up sequence defined in the power-up sequence controller of FIG. 1.

The power-up sequence controller 10 is designed originally to directly control the basic power-up sequence of the system board, as described in the background of the prior art. Generally the power-up sequence controller 10 is included in system chipset(s) or South Bridge. It has a state machine with the basic power-up sequence defined therein, as shown in FIG. 2.

The power source domain 20, including one or more AC-DC power supply 21 and one or more state monitor 22, mainly provides the electricity to the system board(s). The state monitor(s) 22 may be a monitor circuit for detecting the electricity statuses of the basic DC voltage rails provided by the AC-DC power supply 21. The AC-DC power supply 21 in the present invention may serve one or more system board in the computer system, while the state monitor 22 may be implemented on the system board with its power-up sequence controller really controlling the AC-DC power supply 21. Some sorts of power supplies have a dedicated state monitor to indicate the status of its output electricity. In a computer system with multiple system boards, only one power-up sequence controller on a specific system board (such as a head node) can control the AC-DC power supply.

The basic voltage domain(s) 40 includes a DC-DC converter 400, a state monitor 401 and plural electrical components 402. The DC-DC converter 400 converts the basic DC voltage rail(s) into a certain voltage rail and provides to the electrical components 402 involved in each of the basic voltage domains 40. The state monitor 401 detects the electricity statuses of the certain voltage rails provided by the DC-DC converter 400. In the present invention the basic voltage domain(s) is the voltage domain(s) originally designed to use, according to the power-up sequence defined in the power-up sequence controller 10. Generally different voltage domains may have different operating voltages.

The remote monitor module 50 in the present embodiment includes a monitor logic 51 and a BMC (Base Management Controller) 52.

The monitor logic 51 is in circuit connection with the BMC 52, the power-up controller 10, the power source domain 20 and the basic voltage domains 40. A "monitor power-up sequence" is defined in the monitor logic 51. The monitor logic 51 will generate and transmit control signals according to the monitor power-up sequence. A CPLD (Complex Programmable Logic Device), SPLD (Simple Programmable Logic Device) or FPGA (Field Programmable Gate Array) may be used to realize the monitor logic 51 in an integrated device. As long as the functions of the monitor logic involved in the present invention are achieved, certain combination of on-board monitor circuits may operate as the monitor logic as well.

Basically, in the present invention, the basic power-up sequence is included in the monitor power-up sequence. But in the present embodiment the monitor power-up sequence is the same as the basic power-up sequence.

When the computer system is turned on with power, the power-up sequence controller 10 will transmit basic enable signal(s) $S_{en}$ to the monitor logic 51 according to its basic power-up sequence. These basic enable signals $S_{en}$ are originally sent to the basic voltage domains 40 and/or the power source domain 20 for the enabling process. In the embodiment of the present invention the basic enable signals $S_{en}$ are used as state signals for the monitor logic 51. Since the monitor power-up sequence and the basic power-up sequence are the same in the embodiment, the monitor logic 51 will then generate and transmit only the same basic enable signals $S_{en}$ to enable the basic voltage domains 40 and/or the power source domain 20 according to the monitor power-up sequence.

When the output electricity in each of the basic voltage domain 40 and/or the power source domain 20 is detect normal respectively, the basic valid signals $S_{en}$ are generated by the state monitors 21, 401 and send back to the power-up sequence controller 10 through the monitor logic 51; wherein the basic valid signals $S_{en}$ from the state monitors 21, 401 will also be used as state signals for the monitor logic 51. Similarly, since the monitor power-up sequence and the basic power-up sequence are the same in the embodiment, the monitor logic 51 will then generate and transmit only the same basic valid signals $S_v$ back to the power-up sequence controller 10.

Moreover, the monitor logic 51 may generate power initialization event/state signals according to the monitor power-up sequence and the received basic enable and valid signals $S_{en}$ and $S_v$. Next, send the power initialization event/state signals to the BMC 52. Basically, the BMC 52 is for connecting a remote management host (not shown). So the power initialization event/state signals may be sent to the remote management host through the BMC 52. The remote management host in the present invention may be configured inside/outside the same chassis as a head node in a clustering system or an external management host.

Accordingly, the remote monitor module 50 disclosed in the embodiment of the present invention allows the user to access the power initialization event/state signals from the remote management host. The power initialization of the system board may be monitored, without opening the chassis, using a scope or a logic analyzer.

The BMC 52 in the present invention generally connects with the remote management host through a remote management link. The remote management link may be compatible with the communication links defined in the IPMI (Intelligent Platform Management Interface) Specification, such as the communication links through system I/O bus, Network Interface (NIC controller and connector), Serial Port, and even SMBus (System Management Bus) between system boards. Besides, in the present invention, the BMC 52 may be simply implemented as a dedicated local management controller configured on the system board or on a SMDC (System Management Daughter Card), or as a centralized system-level local management controller for multiple system boards in the computer system.

Figure 4:
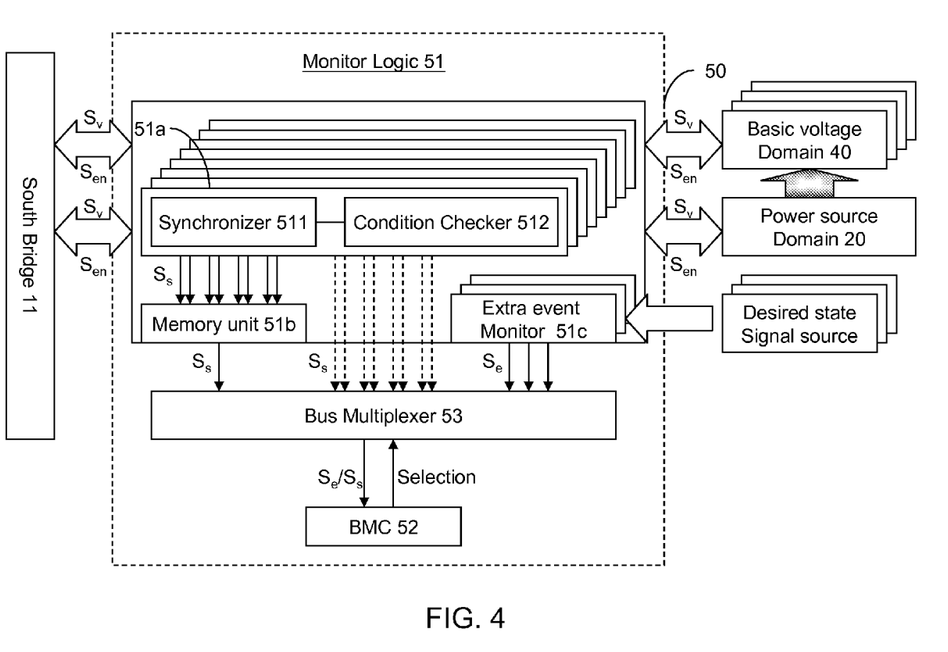
FIG. 4 is an explanatory diagram of another preferred embodiment, illustrating another monitoring architecture for power initialization according to the present invention.

Please refer to FIG. 4, which illustrates another embodiment of the present invention. One way to have the monitor power-up sequence defined by the monitor logic 51 is to implement an extra state machine in the monitor logic 51. A common state machine includes state monitor circuit(s) and one or more memory unit to record the current state of the power-up sequence. In the present embodiment, plural extra state monitors 51a and a memory unit 51b may realize the function of a state machine. However, a integrated extra state machine with proper hardware configuration may also be implemented in the monitor logic 51 to define the monitor power-up sequence.

The extra state monitors 51a are in circuit connection with the memory unit 51b, a south bridge 11 (a power-up sequence controller embedded therein), the power source domain 20 and the basic voltage domains 40. Each of the extra state monitors 51a includes a synchronizer 511 and a condition checker 512. The synchronizer 511 receives the basic enable signal $S_{en}$ from the south bridge 11 or the basic valid signal $S_v$ from the power source domain 20 or the basic voltage domains 40, synchronizing with the system clock and then send to the condition checker 512. In some situations, for those basic enable/valid signals $S_{en}/S_v$ that are ready synchronized, the synchronizer 511 is not essential. The condition checker 512 is in circuit connection with the synchronizer 511, confirming whether the synchronized basic enable/valid signal $S_{en}/S_v$ is at a designed voltage level (indicating a certain state), and then transmits to the memory unit 51b. The condition checkers 512 in the extra state monitors 51a are well arranged to follow the requirements of the monitor power-up sequence.

The memory unit 51b may includes a shift register or a counter to record the current state of the monitor power-up sequence according to the synchronized, checked basic enable/valid signal $S_{en}/S_v$ from the extra state monitors 51a. Then the memory unit 51b sends a state signal $S_s$ to the BMC 52 or allows the BMC 52 to access the current state of the monitor power-up sequence.

The state machine function of the monitor logic 51 allows monitoring the current state of the monitor power-up sequence remotely. If necessary, the synchronized, checked basic enable/valid signal $S_{en}/S_v$ from the extra state monitors 51a may also be transmitted to the BMC 52 directly to monitor each step in the monitor power-up sequence. Actually, some of the extra state monitors 51a may be used to monitor certain hardware and send similar state signals to the BMC 52.

If there are more power-related event needs to be monitored, one or more extra event monitor 51c may be implemented in the monitor logic. The event monitor 51c basically includes a synchronizer, a condition check and a event latch (all not shown). The synchronizer and the condition checker are similar to those in the extra state monitor 51a; only it processes some desired extra state signals from the extra state signal sources. The extra state signal sources may be those system hardware components, the system I/O bus or status monitors (all not shown) which are related to power initialization. The event latch latches and remains the extra state signals at a specific voltage level, and transmits to the BMC 52. Besides, for those desired state signals that are already synchronized with the system clock, the synchronizer is also not essential for the extra event monitor 51c. Moreover, the extra state monitor and the event latch may be used to fulfill the requirements for the event monitor. An integrated event monitor may not be essential.

In the present invention, all the synchronizer, the condition checker and the event latch may be realized by circuits with flip-flops; only the detailed actual implementation depends. And all the state/event signals in the present invention that are related to power initialization and sent to the BMC are considered as power initialization event/state signals. Usually an event signal is a state signals latched at a specific voltage level to indicate an event. But only the synchronized, checked basic enable/valid signal $S_{en}/S_v$ will be transmitted to the power-up sequence controller (system chipset or South Bridge), the power source domain or the basic voltage domains.

Accordingly, as shown in FIG. 4, the BMC 52 might need to receive multiple power initialization event/state signals. But a common BMC has only limited bus bandwidth, generally GPIO (General Purpose Input/Output) pins for customized functions; the limited bus bandwidth is not enough for receiving all the power initialization event/state signals at the same time. Therefore, one solution is that the remote monitor module 50 may further include a bus multiplexer 53 configured between the monitor logic 51 and the BMC 52. The power initialization event/state signals will then be transmitted to the bus multiplexer 53 first. Then the bus multiplexer 53 will select one type signals from the power initialization event/state signals and send to the BMC 52 according to selection signal(s) from the BMC 52. The selection signal(s) may be transmitted from the BMC 52 according to the commands of the remote management host or a selection logic inside the BMC 52.

Figure 5:
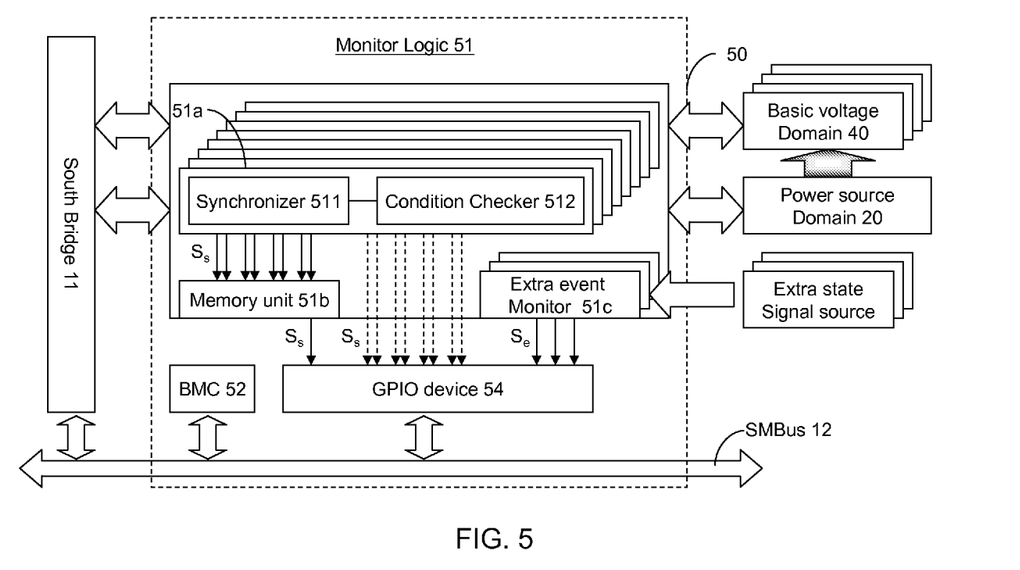
FIG. 5 is an explanatory diagram of another preferred embodiment, illustrating another monitoring architecture for power initialization according to the present invention.

Please also refer to FIG. 5. Another solution for the communication path between the monitor logic 51 and the BMC 52 is applying a GPIO device 54 into the remote monitor module 50. The GPIO device 54 provides sufficient GPIO pins for the power initialization event/state signals. A GPIO expander or a controller with spare GPIO pins may realize the function of the GPIO device 54. Both the BMC 52 and the GPIO device 54 need to be connected to a SMBus (System Management Bus) 12 extended from the south bridge 11 on the system board. The power initialization event/state signals will then be transmitted to the GPIO device 54 and accessed by the BMC 52 through the SMBus 12.

The remote monitor module according to the present invention allows the user to make system changes and modify power-up sequence so the system board may change some power-related hardware configurations and the monitor power-up sequence of the monitor logic 51 may have more monitored steps/states than the basic power-up sequence of the power-up sequence controller to control the corresponding power initialization changes.

Figure 6A:
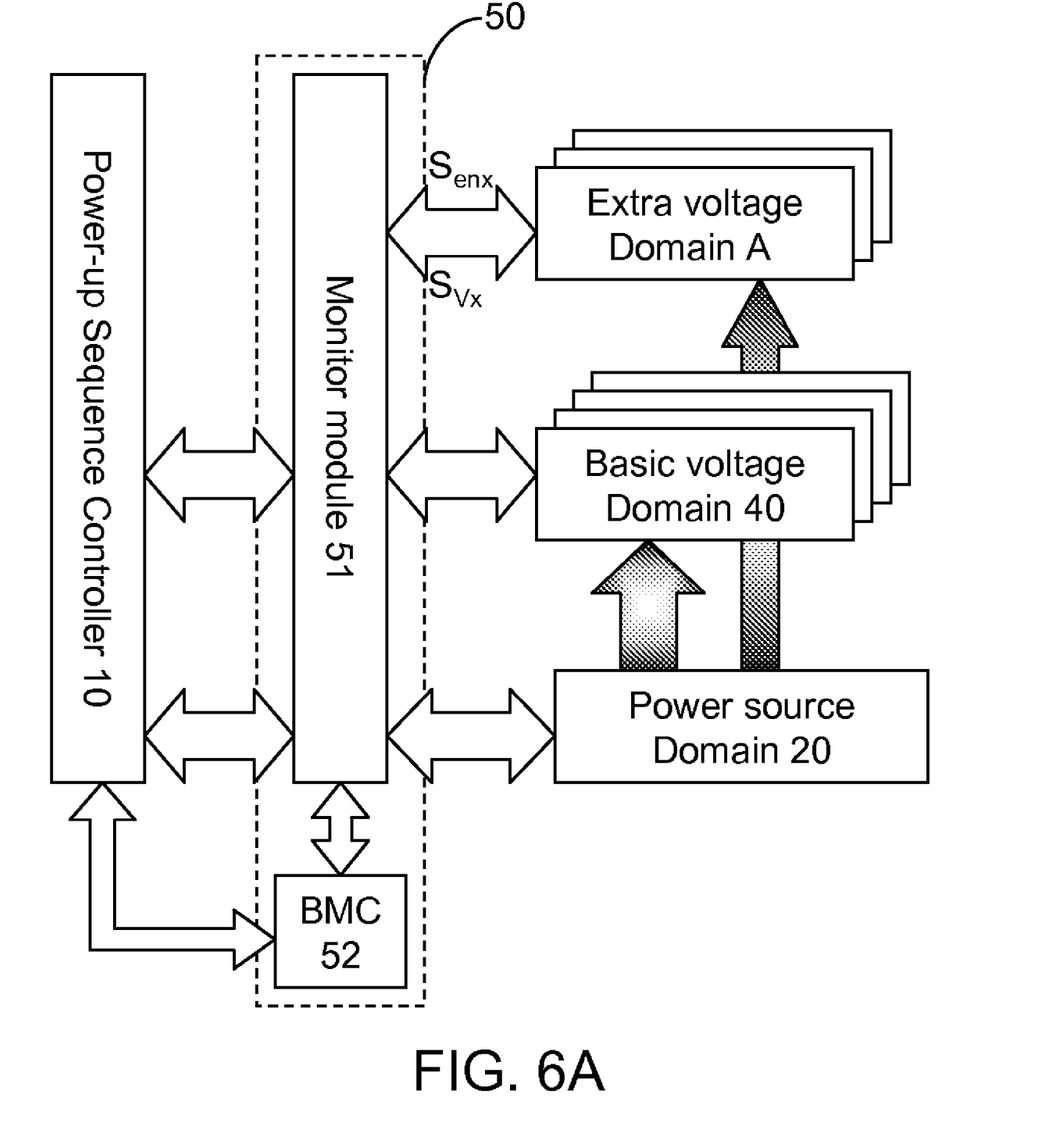
FIG. 6A is an explanatory diagram of another preferred embodiment, illustrating another monitoring architecture for power initialization according to the present invention.
Figure 6B:
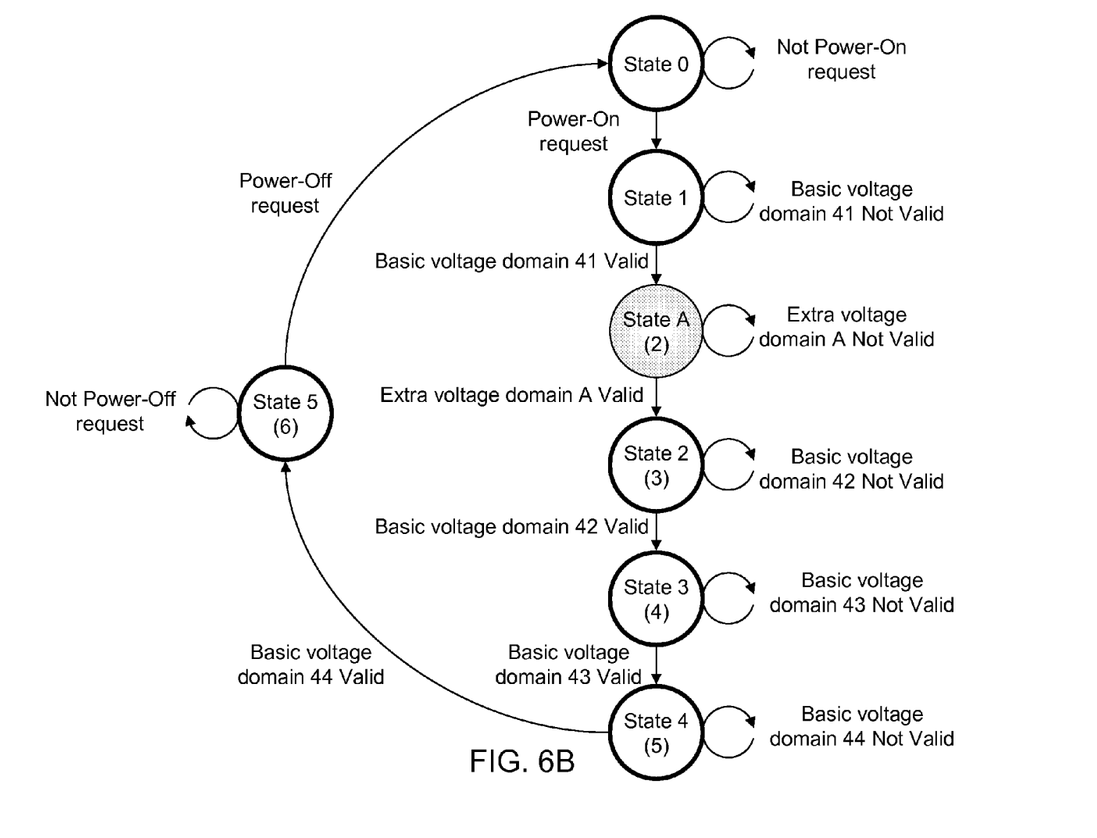
FIG. 6B is an explanatory diagram of a monitor power-up sequence defined in the monitor logic of FIG. 6A.

Please refer to FIGS. 6A and 6B. When a new component is add to the system board, some extra voltage rails needs to be monitored, or some power-related hardware configurations are changed, one or more extra voltage domain A will be monitored by the remote monitor module 50. The extra voltage domain A is in circuit connection with the monitor logic 51 to receive extra enable signal(s) $S_{enx}$ and provide extra valid signal(s) $S_{vx}$. So the monitor logic 51 may transmit the extra enable signal $S_{enx}$ according to the monitor power-up sequence to enable the extra voltage domain A, and receive the extra valid signal $S_{vx}$ from the extra voltage domain. Assume the extra voltage domain A has to be actuated between the original state 1 and 2; namely, the extra voltage domain A is actuated after the basic voltage domain 41 and before the basic voltage domain 42. Then the states of the monitor power-up sequence from actuating the extra voltage domain A will be different from the basic power-up sequence. The modified state numbers are shown in the parentheses of FIG. 6B. The extra enable signal(s) $S_{enx}$ and extra valid signal(s) $S_{vx}$ can only be monitored through the BMC 52, instead of the power-up sequence controller 10.

Figure 7:
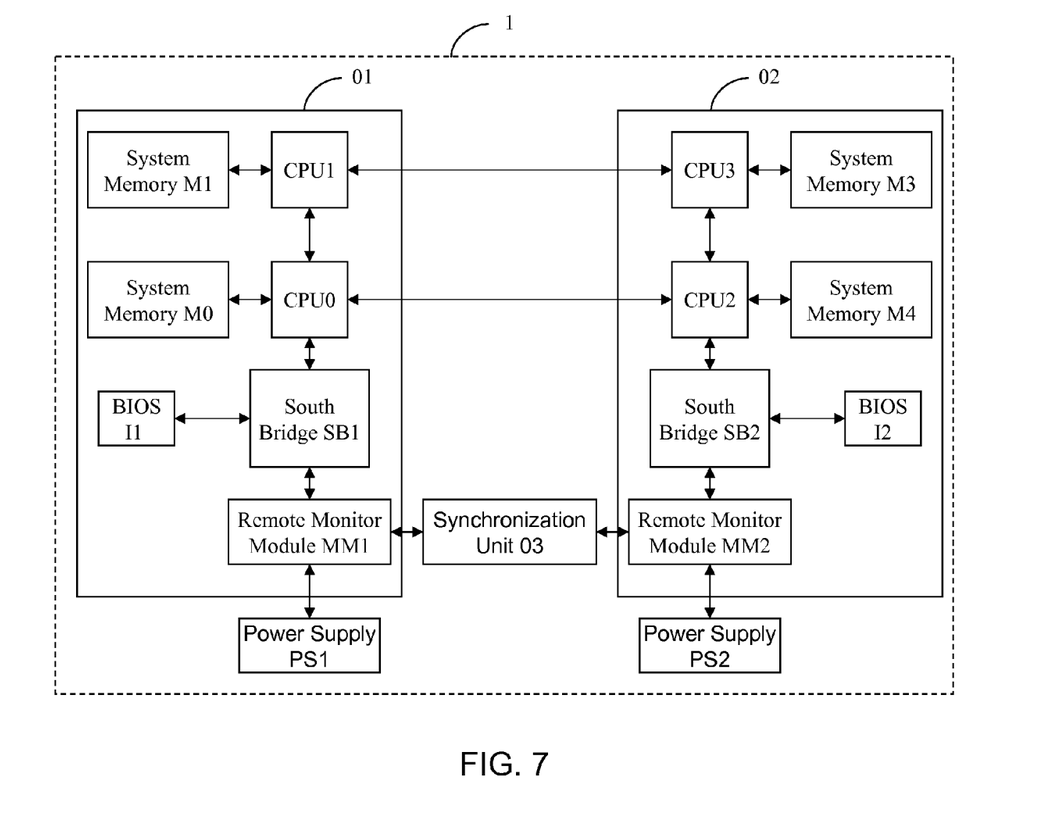
FIG. 7 is an explanatory diagram of another preferred embodiment according to the present invention, illustrating a monitoring architecture for power initialization changes in a computer system with flexible SMP configurations.

Please refer to FIG. 7. The remote monitor module 50 disclosed in the present invention provides capability for a computer system to be modified between different SMP (Symmetric Multi-Processing) configurations. As shown in FIG. 7, a computer system 1 includes two system boards 01, 02 and two power supplies PS1, PS2. The system board 01 includes two processors CPU0, CPU1 with dedicated system memories M0, M1, a south bridge SB1, a BIOS (boot image embedded in a memory device) 11 and a remote monitor module MM1. Similarly, the system board 02 includes two processors CPU2, CPU3 with dedicated system memories M2, M3, a south bridge SB2, a BIOS (boot image embedded in a memory device) 12 and a remote monitor module MM2.

In one of the flexible SMP configurations, the two system boards 01, 02 may be booted up with its BIOS I1/I2 independently, using its dedicated power supply PS1/PS2 to actuate the voltage domains respectively. The two system boards 01, 02 may operate as two computers, capable of performing clustering tasks through specific management software/firmware/hardware. The remote monitor modules MM1, MM2 may provides the monitoring functions disclosed above for each of the two system boards 01, 02.

In another SMP configuration, the two system boards 01, 02 may be booted up as one single computer. The processor CPU0 will operate as a primary processor to access the BIOS I1 and boot-up all the system components involved in both the two system boards 01, 02, while the processors CPU1, CPU2, CPU3 will operates as slave processors and be initialized by the processor CPU0. At the moment, the remote monitor modules MM1, MM2 may be synchronized by a synchronization unit 03 to combine the two power-up sequences as one.

Or, the remote monitor module MM1 may possibly take over the control for the power-up sequence of the whole computer system 1 and disable the remote monitor module MM2. This approach may be realized by modifiable monitor logic, such a FPGA-based device.

However, the detailed implementation of the embodiment will not be further described in the present invention. Through the aforesaid functions of the remote monitor module, the major technical problem for the power initialization changes involved in a computer system with flexible SMP configuration has been solved in a large part by the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote monitor module for monitoring a plurality of power initialization events/state signals on a system board of a computer system, comprising:

a BMC (Baseboard Management Controller) for connecting with a remote management host; and a monitor logic in circuit connection with the BMC, and a power-up sequence controller and a plurality of basic voltage domains of the system board, transmitting a plurality of basic enable signals received from the power-up sequence controller to enable the basic voltage domains, and transmitting a plurality of basic valid signals received from the basic voltage domains to the power-up sequence controller, and generating and transmitting a plurality of power initialization event/state signals to the remote management host through the BMC, wherein a basic power-up sequence is defined in the power-up sequence controller and a monitor power-up sequence is defined in the monitor logic, the basic power-up sequence being included in the monitor power-up sequence, and the monitor logic configured to transmit the basic enable and valid signals and the power initialization event/state signals according to the monitor power-up sequence, and wherein the monitor logic further comprises at least one condition checker and at least one event latch, the condition checker configured to confirm whether at least one extra state signal from at least one extra state signal source is at a designed voltage level, and the event latch configured to latch and keep the checked extra state signal at a specific voltage level and transmit to the BMC.

2. The remote monitor module of claim 1, wherein the monitor logic is in circuit connection with at least one extra voltage domain, the monitor logic transmitting at least one extra enable signal according to the monitor power-up sequence to enable the extra voltage domain, and receiving at least one extra valid signal from the extra voltage domain.

3. The remote monitor module of claim 1, wherein the monitor logic comprises an extra state machine to define the monitor power-up sequence.

4. The remote monitor module of claim 1, wherein the condition checker or the event latch comprises at least one flip-flop.

5. The remote monitor module of claim 1, wherein the power-up sequence controller is embedded in system chipset or South Bridge.

6. The remote monitor module of claim 1, wherein the basic voltage domain comprises a DC-DC converter and a plurality of electrical components.

7. The remote monitor module of claim 1, wherein the BMC is implemented as a dedicated local management controller configured on the system board or on a SMDC (System Management Daughter Card), or as a centralized system-level local management controller for the whole computer system.

8. The remote monitor module of claim 1, wherein the monitor logic is implemented by a plurality of on-board monitor circuits, CPLD (Complex Programmable Logic Device), SPLD (Simple Programmable Logic Device) or FPGA (Field Programmable Gate Array).

9. The remote monitor module of claim 1, wherein the monitor logic comprises a plurality of extra state monitors and a memory unit to define the monitor power-up sequence.

10. The remote monitor module of claim 9, wherein the memory unit comprises a shift register or a counter for recording the current state of the monitor power-up sequence.

11. The remote monitor module of claim 9, wherein the extra state monitor comprises a condition checker for confirming whether the basic enable signal or the basic valid signal is at a designed voltage level, and then transmitting to the memory unit for recording the current state of the monitor power-up sequence.

12. The remote monitor module of claim 11, wherein the extra state monitor further comprises a synchronizer for synchronizing the basic enable signal or the basic valid signal with a system clock and transmitting to the condition checker.

13. The remote monitor module of claim 1 further comprising a GPIO (General Purpose Input/Output) device to provide a plurality of GPIO pins for receiving the power initialization event/state signals.

14. The remote monitor module of claim 13, wherein both the BMC and the GPIO device connect to a SMBus (System Management Bus), the power initialization event/state signals being accessed by the BMC through the SMBus.

15. The remote monitor module of claim 1 further comprising a bus multiplexer configured between the BMC and the monitor logic to select and transmit one or more of the power initialization event/state signals to the BMC.

16. The remote monitor module of claim 15, wherein the bus multiplexer selects the power initialization event/state signals according to at least one selection signal from the BMC.

17. The remote monitor module of claim 1, wherein the monitor logic is in circuit with a power source domain of the computer system, transmitting the basic enable signals received from the power-up sequence controller to enable the power source domain, and transmitting the basic valid signals received from the power source domain to the power-up sequence controller.

18. The remote monitor module of claim 17, wherein the power source domain comprises at least one AC-DC power supply.

* * * * *